March 11, 1952  D. M. McCALLUM  2,588,743
SERVO CONTROL SYSTEM
Filed June 12, 1950  2 SHEETS—SHEET 1

Donald Murdo McCallum
Inventor
By Cushman, Darby & Cushman
Attorneys

Patented Mar. 11, 1952

2,588,743

UNITED STATES PATENT OFFICE 2,588,743

SERVO CONTROL SYSTEM

Donald Murdo McCallum, Edinburgh, Scotland, assignor to Ferranti Limited, Hollinwood, England, a British company Application June 12, 1950, Serial No. 167,676
In Great Britain June 16, 1949

4 Claims. (Cl. 318—28)

This invention relates to servo systems of the type in which the relative dispositions of movable input and output members determine the value of a relative characteristic, such as a phase or frequency difference, of input and output voltages and in which any non-correspondence between the dispositions of the two members causes a departure of that relative characteristic from a fixed datum value, from which departure is developed a corrective adjustment of the output member.

In the majority of cases the input and output members are rotatable shafts, their relative dispositions being their angular positions.

In a known variety of servo system of this type the dispositions of the members control the frequencies of the input and output voltages. In this case the relative characteristic above mentioned is the difference between these frequencies, the fixed datum value of this difference being zero. Whenever the value of the relative characteristic departs from zero, i. e. whenever the frequencies become unequal, consequent upon the non-correspondence of the members, an error signal is developed—usually in dependence on the heterodyne beat-note of the unequal frequencies—and is applied to adjust the output member to the correct position. This variety is apt to be slow in action and not very reliable for small departures of the members from correspondence.

Another known variety of servo system of the type stated operates in a similar manner to that described in the preceding paragraph except that instead of operating on a frequency difference it operates on a phase difference, using some sort of discriminator to derive the error signal. The dispositions of the members accordingly control the frequencies of the input and output voltages as before but the relative characteristic is here the phase difference between the input and output voltages. The fixed datum value of this difference is zero degrees or 90 degrees depending on the type of phase discriminator used. With this variety the servo motor is seldom fast enough in operation to prevent the phase difference shifting beyond 90 degrees so that a beat frequency is apt to be produced instead of the required D. C. error signal.

The object of the present invention is to provide a servo system of the type stated of simple and efficient character.

A further object of the invention is to provide a servo system of the type stated in which the corrective adjustment of the output member is effected more quickly, which is reliable for small departures of said members from correspondence, and in which the development of a D. C. error signal is ensured.

In accordance with the present invention a servo system has an input member and output member to be maintained in dispositional correspondence, a source of input A. C. voltage, means for rendering the frequency of said input A. C. voltage dependent on the disposition of said input member, a tunable oscillator, means for tuning said oscillator in dependence on the disposition of said output member, means for applying said input A. C. voltage to said oscillator to maintain oscillations therein at the frequency of said input voltage, means for deriving from said oscillator an output A. C. voltage having said frequency and having a phase difference with respect to said input voltage dependent on the tuning of said oscillator, means for deriving an error signal from any departure of said phase difference from a fixed datum value, and motor means for utilizing said error signal to bring said output member into dispositional correspondence with said input member, thereby modifying the tuning of said oscillator to reduce said error signal to zero.

In the accompanying drawings.

Figure 1:
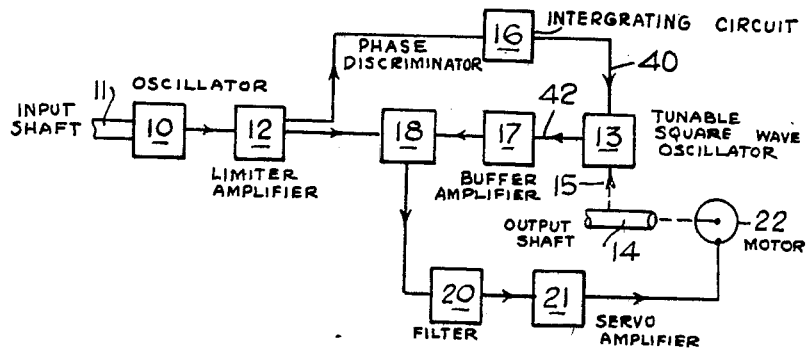
Figure 1 is a schematic diagram of one embodiment of the invention.

In carrying out the invention according to one form by way of example a servo system having an input and an output member to be maintained in dispositional correspondence, that is to say an input and an output shaft to be maintained in angular correspondence, comprises a source of input A. C. voltage in the form of an oscillator 10, see Figure 1. The frequency of the input voltage derived by the oscillator is dependent on the angular disposition of the input shaft 11, which may for example be arranged to adjust the tuning of a condenser forming part of the oscillatory circuit. The input voltage, which is of approximately sinusoidal waveform, is applied to a combined limiter and amplifier 12 designed to provide an amplified square waveform of the same frequency and having a constant amplitude despite any fading or distortion of the sinuosoidal waveform. A tunable square wave oscillator 13 is designed, as will be described in detail later, so as to be tuned in dependence on the angular disposition of the output member 14 which is coupled to some frequency-determining component of the oscillator by a linkage 15. The input voltage is applied, after modification to square waveform by limiter 12, to oscillator 13 by way of an integrator circuit 16, which is designed to convert the square waveform of the input voltage to a triangular waveform advanced in phase by 90 degrees; the input voltage with the triangular waveform thus displaced is so applied to the oscillator as to maintain its oscillations at the frequency of the input voltage. From oscillator 13 is derived an output A. C. voltage of square waveform having the frequency of the input voltage. Oscillator 13 and the method of deriving the output voltage are such that the phase difference between this voltage and the input voltage of triangular waveform is dependent on the tuning of the oscillator, as controlled by output shaft 14 over linkage 15. When the oscillator is tuned to the frequency of the input voltage this phase difference is 180 degrees; when the oscillator is not tuned to this frequency this phase difference changes, the extent and sense of the change being dependent on the extent and sense of the mistuning.

The output voltage is applied by way of a buffer amplifier 17 to a phase discriminator 18, to which is also applied the input voltage after modification to square waveform by limiter 12. This discriminator is designed in known manner to derive a D. C. error signal voltage that is in sense and quantitative dependence on any departure of the phase difference between the applied voltages from a fixed datum value; it is assumed that the discriminator used is of the type in which this datum value is 90 degrees.

The error signal is applied by way of a filter 20 and a servo amplifier 21 to motor means in the form of a reversible servomotor 22 the motor of which is connected direct or through a suitable transmission system to output shaft 14. Filter 20 is designed to eliminate any alternating voltages, especially those at the sum frequency of the input and output voltages, from the D. C. error signal voltage.

In operation, the system is so arranged that when the input and output shafts are in angular correspondence oscillator 13 is tuned to the frequency of the input voltage. In consequence the output voltage is in exact anti-phase with the input voltage of triangular waveform derived from integrator 16 and therefore is in quadrature with the input voltage of square waveform applied to discriminator 18. Accordingly no error signal is developed by the discriminator.

The rotation of input shaft 11 from angular correspondence with output shaft 14 causes the frequency of the input voltage to deviate from the frequency to which oscillator 13 is tuned. As a result of this the output voltage ceases to be in exact anti-phase with the input voltage of triangular waveform and so ceases to be in quadrature with the input voltage of square waveform applied to discriminator 18. The phase difference between the voltages applied to the discriminator thus departs from the datum value and an error signal voltage becomes developed; the value of this signal is dependent on the extent of this departure of the phase difference from the datum value, whilst the sense of the error signal—i. e. whether the signal is represented by a positive or negative D. C. voltage—is dependent on the sense of this departure, that is to say is dependent on whether the rotation of the input shaft has caused the input voltage frequency to increase above or fall below the frequency to which oscillator 13 is tuned.

The error signal voltage thus generated causes motor 22 to rotate in a direction dependent on the sense of the signal. This direction is such that output shaft 14 is rotated towards renewed angular correspondence with input shaft 11, whilst the modification of the tuning of oscillator 13 due to this rotation of output shaft 14 (acting through linkage 15) is towards the new frequency of the input voltage. The error signal continues to be developed and the motor continues to rotate until oscillator 13 is tuned to the new frequency; the voltages applied to the discriminator are then again in quadrature, the error signal ceases to be developed, and the motor ceases to rotate. Output shaft 14 is then again in angular correspondence with input shaft 11.

Figure 2:
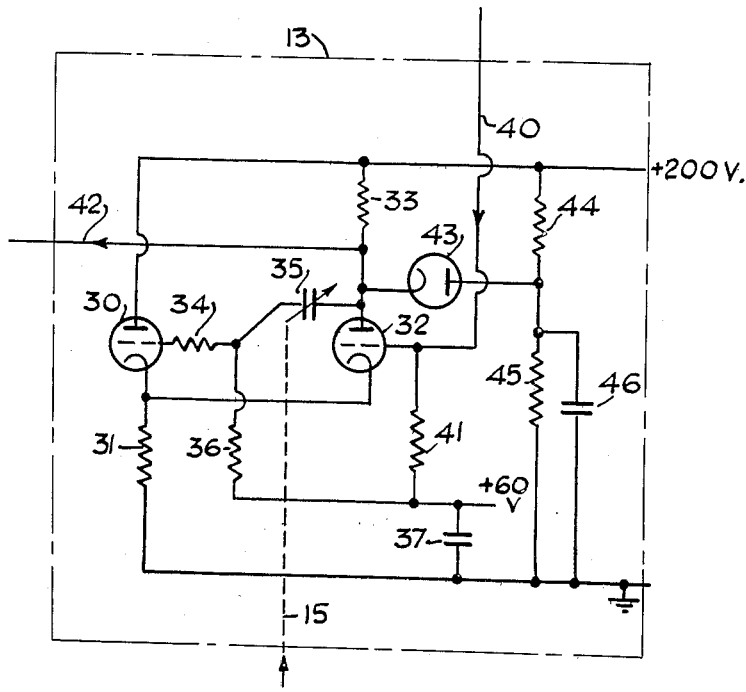
Figure 2 shows details of a part of the embodiment in Figure 1.

A convenient circuit arrangement for oscillator 13 is shown in Figure 2. A valve 30, shown as a triode, is connected as a cathode follower; its anode is accordingly connected direct to the positive pole of the source of high tension and its cathode is connected to earth by way of a load resistor 31. This cathode is also connected to the cathode of a second triode valve 32 the anode of which is connected to the positive pole of the source by way of a load resistor 33. The control grid of valve 30 is coupled to the anode of valve 32 by way of a time-constant circuit comprising a resistor 34 and a tunable condenser 35, the common point of these components being connected by way of another resistor 36 to a source of positive bias voltage, which is decoupled to earth by a condenser 37. The tuning of condenser 35 is controlled by output shaft 14 by way of linkage 15. The input voltage of triangular waveform derived from integrator 16 is applied to the control grid of valve 32 by way of a connection 40; this control grid is also connected to the bias source by way of a resistor 41. The output voltage of square waveform is derived from the anode of valve 32 and fed to buffer amplifier 17 by way of a connection 42. The anode of valve 32 is also connected to the cathode of a catching diode valve 43 the anode of which is connected to the common point of resistors 44 and 45 which form a potentiometer across the supply. Resistor 45 is decoupled by a condenser 46.

Suitable values for the high tension voltage and the positive bias voltage are 200 and 60 volts respectively.

This circuit arrangement forms a cathode-coupled multivibrator; in the absence of a locking signal—in this case the input voltage of triangular waveform—on the grid of valve 32 the circuit oscillates in known manner at a natural frequency determined by the time constant of the combination of resistor 34 and condenser 35. The circuit is thus tunable by condenser 35, which constitutes the means for tuning the oscillator in dependence on the disposition of the output member 14.

Figure 3:
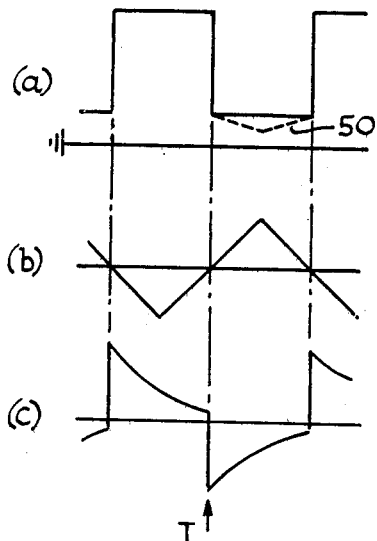
Figures 3 to 5 are waveform diagrams to illustrate the operation of the apparatus shown in Figure 2.
Figure 4:
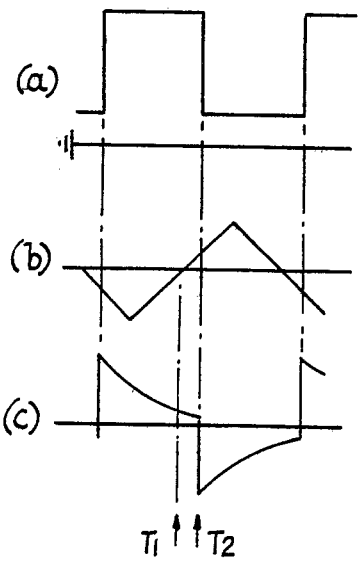
Figure 5:
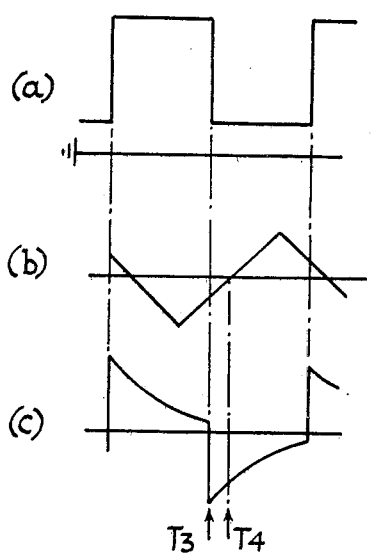

The application of the locking signal over connection 40 drives the oscillator at the frequency of the input voltage. If the oscillator is tuned to that frequency the output voltage on the anode of valve 32 is in exact antiphase with the locking signal. If the oscillator is not tuned to this frequency the phase difference between the output voltage and the locking signal shifts from 180 degrees in a direction dependent on whether the oscillator tuning is above or below the input voltage frequency and to an extent dependent on the extent of the mistuning. This effect is illustrated by the waveforms of Figures 3 to 5, in each of which the waveform (a) is that of the output voltage derived from the anode of valve 32, waveform (b) is the grid/cathode voltage of valve 32 due to the input voltage (or locking signal) of triangular waveform, and waveform (c) is the grid/voltage of valve 30. The zero levels of waveforms (b) and (c) are of course at the 60 volt positive potential level of the grid bias supply.

Figure 3 shows the waveforms when the oscillator is tuned to the frequency of the input voltage or locking signal (b). It will be seen from these waveforms that when at the time T the locking signal passes through zero the grid/cathode voltage (c) of valve 30 has fallen just sufficiently to reduce the common cathode potential (through cathode-follower action) to a value such as to allow the locking signal to trigger valve 32 and so switch the multivibrator over. The phase difference between voltages (a) and (b) is thus exactly 180 degrees.

Figure 4 shows the waveforms when the natural frequency of the oscillator is below that of the input voltage, this being because the time constant of the resistor 34 and condenser 35 is too long. In this case when at time $T_1$ the locking signal passes through zero, the grid/cathode voltage (c) has not fallen sufficiently to allow the multivibrator to be switched over, which operation is delayed to the time $T_2$. The phase difference between waveforms (a) and (b) is thus reduced below 180 degrees, with waveform (a) leading.

Figure 5 shows the waveforms when the natural frequency of the oscillator is above that of the input voltage. The time constant is now so short that the grid and hence the cathode potentials of valve 30 fall sufficiently to allow the locking signal to switch the multivibrator over at a time $T_3$ before this signal has risen to zero value at time $T_4$. The phase difference between waveforms (a) and (b) is again less than 180° but this time waveform (b) is leading.

The function of the catching diode 43 (see Figure 2) is to prevent the anode voltage of valve 32 from falling below the voltage level of the common point of potentiometer resistors 44 and 45, otherwise the low potential levels of the square waveform of the output voltage would be distorted by triangular depressions indicated by the dotted line 50 of waveform (a) in Figure 3.

Phase discriminator 18 may be a conventional ring modulator. Integrator 16 for deriving from a voltage of square waveform a voltage of triangular waveform advanced in phase by 90 degrees may comprise a Miller integrator to the control grid of which the square waveform of the input voltage is applied, this grid being biased to the middle of the straight part of the valve's characteristics. The potential on the anode of the valve then falls linearly with respect to time during the positive half-cycles of the input voltage of square waveform and rises linearly during the negative half-cycles. The required triangular waveform is thus developed at the anode of the valve. This type of integrator is of course well known.

Where the phase discriminator is of the kind that produces a zero error signal when the phase difference between the applied voltages has some datum value other than 90 degrees suitable phase-shift modifications will of course have to be made to the system as described above to ensure that the error signal is zero when the input and output shafts are in dispositional correspondence.

The above-described embodiments are for illustrative purposes only and may be modified in detail within the scope of the invention; for example, the servomotor need not necessarily be a reversible motor conntrolled by the direct application of the error signal but may instead be a non-reversible motor rotated at a constant speed and coupled to the output shaft by oppositely-acting clutches which are themselves controlled by the error signal.

It will be seen that the system in accordance with the invention the corrective adjustment of the output member is effected very quickly and with a reliability that is maintained for small departures of the members from correspondence.

I claim:

1. A servo system having an input member and an output member to be maintained in dispositional correspondence, a source of input A. C. voltage, means for rendering the frequency of said input A. C. voltage dependent on the disposition of said input member, a tunable oscillator, means for tuning said oscillator in dependence on the disposition of said output member, means for applying said input A. C. voltage to said oscillator to maintain oscillations therein at the frequency of said input voltage, means for deriving from said oscillator an output A. C. voltage having said frequency and having a phase difference with respect to said input voltage dependent on the tuning of said oscillator, means for deriving an error signal from any departure of said phase difference from a fixed datum value, and motor means for utilizing said error signal to bring said output member into dispositional correspondence with said input member, thereby modifying the tuning of said oscillator to reduce said error signal to zero.

2. A servo system as claimed in claim 1 wherein said tunable oscillator is of the cathode-coupled multivibrator type including two discharge tubes an intermediate electrode of one of which is connected by a time-constant circuit to the anode electrode of the other discharge tube, and said means for tuning said oscillator comprises means for controlling the time constant of said circuit in dependence on the disposition of said output member.

3. A servo system having a movable input member and a movable output member to be maintained in dispositional correspondence, a variable-frequency first oscillator providing a square wave input voltage, means coupling the frequency control of said first oscillator to said movable input member whereby the frequency of said input voltage is dependent upon the disposition of said input member, a tuntable second oscillator, means coupling the tuning control of said second oscillator to said output member whereby the tuning of said second oscillator is dependent upon the disposition of said output member, means for converting said square wave input voltage to a triangular waveform and applying it to said second oscillator to maintain the oscillation frequency of said second oscillator at the frequency of said input voltage, means for deriving from said second oscillator a square wave output oscillation having the same frequency as said input voltage and having a phase displacement with respect to said input voltage which is dependent upon the tuning of said second oscillator, a phase discriminator circuit having two inputs supplied respectively with said square-wave input voltage and said square-wave output voltage and including means for deriving an error signal from any departure of the phase displacement between said applied voltages from a fixed datum value, motor means coupled to said output member and means for utilizing said D. C. error signal to operate said motor means to bring said output member into dispositional correspondence with said input member thereby modifying the tuning of said oscillator to reduce the error signal to zero.

4. A servo system having a movable input member and a movable output member to be maintained in dispositional correspondence, a variable-frequency first oscillator providing a sinusoidal input A. C. voltage, means coupling the frequency control of said first oscillator to said movable input member whereby the frequency of said input A. C. voltage is dependent upon the disposition of said input member, limiter/amplifier means for converting said sinusoidal input A. C. voltage to a square-wave input voltage of constant amplitude, a tunable second oscillator, means coupling the tuning control of said second oscillator to said output member whereby the tuning of said second oscillator is dependent upon the disposition of said output member, means including an integrating circuit for converting said square-wave input voltage to a triangular waveform and applying it to said second oscillator to maintain the oscillation frequency of said second oscillator at the frequency of said input A. C. voltage, means for deriving from said second oscillator a square-wave output oscillation having the same frequency as said input A. C. voltage and having a phase displacement with respect to said square-wave input voltage which is dependent upon the tuning of said second oscillator, a phase discriminator circuit having two inputs supplied respectively with said square-wave input voltage and said square-wave output voltage and including means for deriving a D. C. error signal whose sign and magnitude are dependent upon the departure of the phase displacement between said applied voltages from a fixed datum value, a servo motor means coupled to said output member and means including a servo-amplifier for utilizing said D. C. error signal to operate said servo motor means to bring said output member into dispositional correspondence with said input member thereby modifying the tuning of said oscillator to reduce the error signal to zero.

DONALD MURDO McCALLUM.

REFERENCES CITED

The following references are of record in the file of this patent:

UNITED STATES PATENTS

| Number | Name | Date |
| --- | --- | --- |
| 2,041,855 | Ohl | May 26, 1936 |
| 2,280,019 | Alexandersson | Apr. 14, 1942 |
| 2,466,931 | Crandell | Apr. 12, 1949 |
| 2,468,350 | Sunstein | Apr. 26, 1949 |